(No Model.)
O. P. SCHRIVER.
WIRE CLOTH REEL AND CUTTER.
No. 506,019. Patented Oct. 3, 1893.
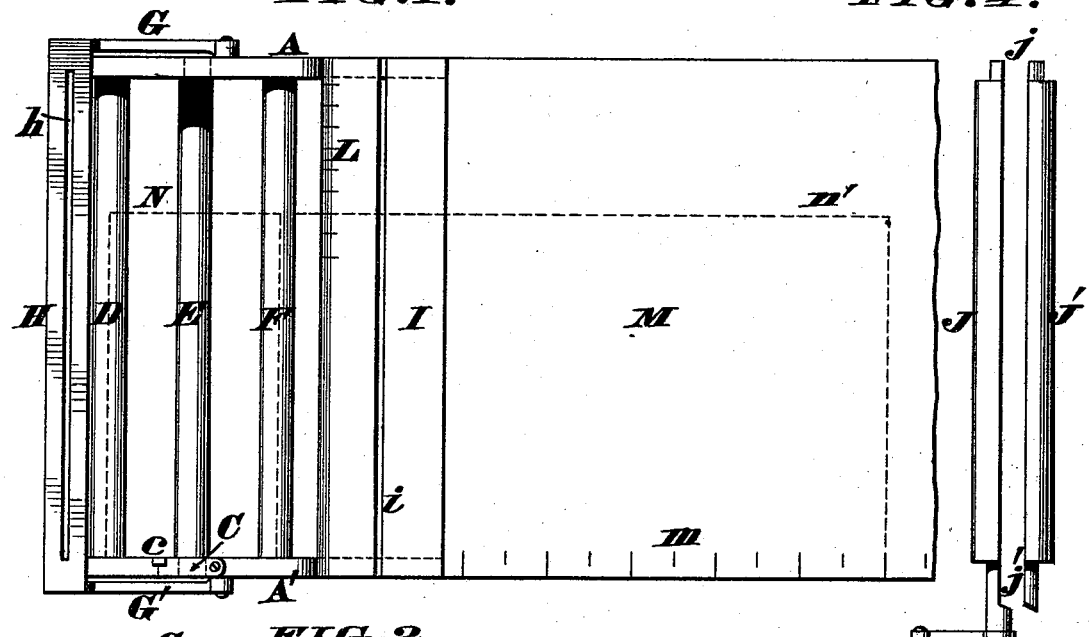
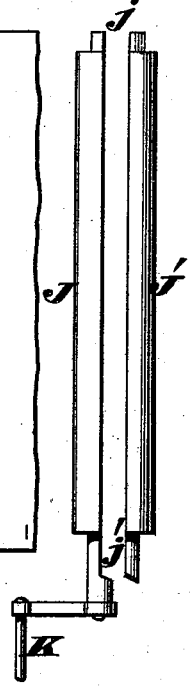
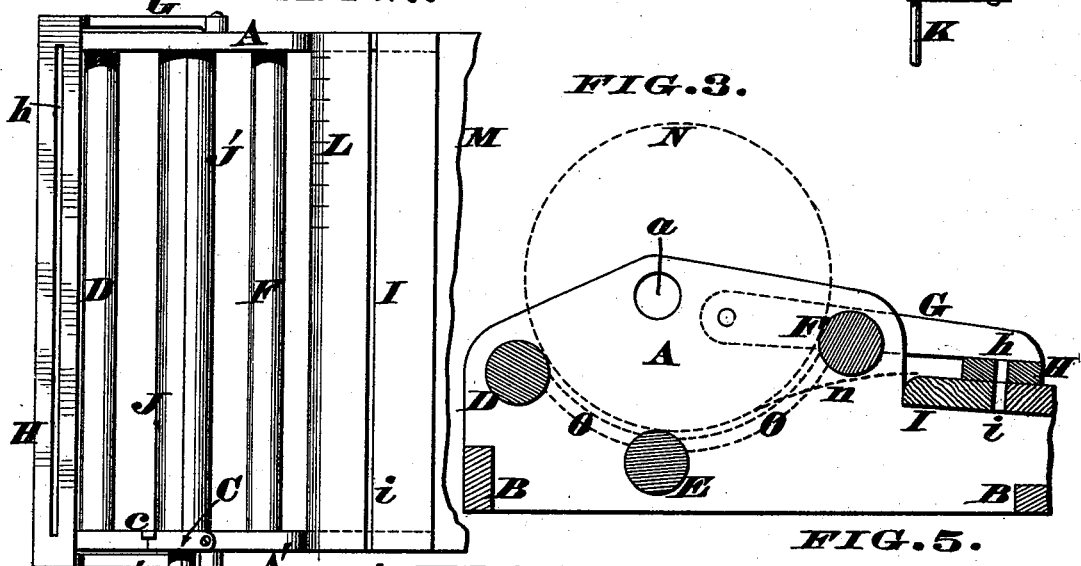
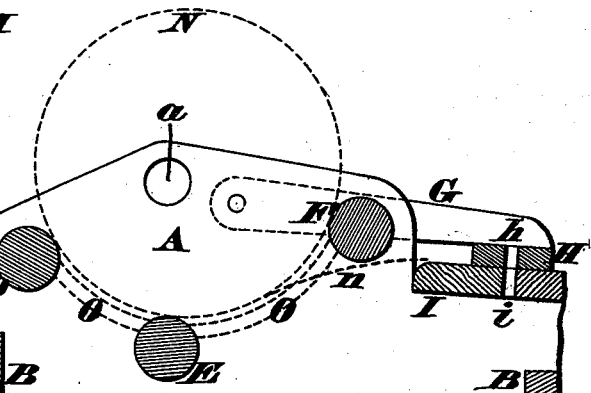
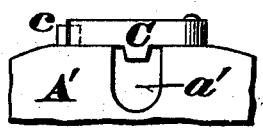
Attest.
John W. Layman
Arthur Moore
Inventor.
Oliver P. Schriver
by James K. Layman
Atty.

UNITED STATES PATENT OFFICE.

OLIVER P. SCHRIVER, OF NEWPORT, KENTUCKY.

WIRE-CLOTH REEL AND CUTTER.

SPECIFICATION forming part of Letters Patent No. 506,019, dated October 3, 1893.

Application filed April 24, 1893. Serial No. 471,640. (No model.)

*To all whom it may concern:*

Be it known that I, OLIVER P. SCHRIVER, a citizen of the United States, residing at Newport, in the county of Campbell and State of Kentucky, have invented certain new and useful Improvements in Wire-Cloth Reels and Cutters; and I do hereby declare the following to be a full, clear, and exact description of the invention, reference being had to the annexed drawings, which form part of this specification.

My invention comprises a cheap, simple and handy machine capable of being used for the threefold purpose of uncoiling a roll of wire-cloth, of cutting the same transversely, and then compactly re-winding this severed portion, the details of said machine and the method of operating it being hereinafter more fully described.

In the annexed drawings—Figure 1 is a plan showing my machine mounted upon a counter, and in condition to admit a roll of wire-cloth. Fig. 2 is a similar view, showing the machine so arranged as to permit the re-coiling of a severed piece of cloth. Fig. 3 is an enlarged vertical section of the machine taken transversely of its rollers, the machine being in condition for cutting off a piece of wire-cloth. Fig. 4 shows the two-part roller used in re-winding the cloth. Fig. 5 shows a turn button that retains this two-part roller within a slotted journal-bearing of the machine. Fig. 6 shows a modified form of knife-guide.

A, A', are the side-plates of the machine, and B, in Fig. 3, represents cross bars wherewith said plates are rigidly secured together.

*a* represents a circular journal-bearing near the top of plate A, and *a'* a slotted journal-bearing near the top of the other side-plate A'.

C is a turn button that closes the open end of this slotted bearing *a'*, and *c* is a stop that limits the inward swing of the free end of said button.

D, E, and F are three rollers, so journaled in the plates A, A', as to afford a receptacle capable of containing the usual sizes of wire-cloth rolls.

G, G', are arms usually pivoted to the outer sides of said plates, and having their free ends attached to a knife-guide H, slotted longitudinally at *h*.

I is a cutting table, slotted or grooved at *i*, and preferably inclined at any suitable angle.

J, J', in Fig. 4 are two counterparts of a split or divided roller, and *j, j'*, are the split journals thereof, the journal *j'* being provided with a crank K.

L is a gage at the inner edge of table I.

M is a counter upon which the machine is mounted, and *m* is a gage at one side thereof.

The dotted circle N, in Fig. 3, represents a roll of wire-cloth, which is first to be uncoiled and then have a piece cut therefrom.

The normal condition of my machine is seen in Fig. 1, reference to which illustration shows that the slotted guide H is now located at the extreme left end of plates A, A', and the button C is in line with plate A', the two-part roller J, J', being dispensed with. When a roll of wire-cloth is to be cut, the selected roll N is placed in the receptacle formed by the three rollers D, E, F, the near end of the coil being in contact with the side plate A'. The instant the roll is thus deposited in said receptacle, the salesman can see at a glance, by referring to the gage L, if the proper width of cloth has been selected. If it has, the loose margin of the cloth is drawn forward, under the roller F, as indicated by the dotted line *n*, in Fig. 3, and carried along upon the counter M, as suggested by the dotted line *n'*, in Fig. 1, which act is readily accomplished because the rollers D, E, F, serve as anti-friction bearings for the coil. The coil is thus unwound until the desired length is obtained, as shown by the scale *m*, and then the knife guide H is swung over to the position seen in Fig. 3, so as to rest upon the cloth, and bring the two slots *h, i*, exactly in line with each other. A knife or other suitable cutter is now drawn through these coincident slots, the result being the immediate severing of the portion from the coil N, the line of separation being squarely across the cloth. The coil is then taken out of the machine, guide H brought back to its normal position, and button C swung around to expose the top of slot *a'*, and thereby enable the ready insertion of the part J, of the divided roller J, J'. The recently-cut end of the piece is then brought to bear against the flat side of this section J, and is clamped thereto by the application of the other part J'. Button C is then restored to its normal position, so as to couple these members J, J', together, and when crank K is properly turned, this severed portion n', is coiled around said divided-roller. Button C is again swung around, the roller and coil removed from the machine, and then the two halves of said roller are drawn separately out of said coil. Consequently, the piece of wire cloth now assumes the shape of a compact roll and can be handled with the utmost facility, especially if it is securely tied as soon as coiled.

In the modification of my invention seen in Fig. 6, the knife guide H $h$, is hinged to one side of the machine at $h'$, and when brought into service, it lays across the table I; stops $i'$, $i'$, of the latter serving to prevent any side play of said guide. Of course, it will be understood that this hinged guide inclines back a little beyond a vertical position when not in use.

Another modification is indicated by the dotted lines O, in Fig. 3, which lines represent a concave trough or valley that may take the place of the three rollers.

I claim as my invention—

1. The combination, in a cloth-cutting machine, of a frame, a slotted or grooved cutting-table secured thereto, and a set of rollers journaled in said frame, and so arranged as to form a concave receptacle, for the purpose stated.

2. The combination, in a wire-cloth reel and cutter, of side plates A, A', having the slotted or grooved cutting-table I $i$, secured to them, the rollers D, E, F, journaled in said plates, and arms G, G', pivoted to the latter, which arms carry a longitudinally-slotted knife-guide H $h$, for the purpose described.

3. The combination, in a wire-cloth reel and cutter, of side plates A, A', having, respectively, an opening $a$ and slot $a'$, a two-part roller J, J', provided with divided journals $j$, $j'$, capable of bearing within said opening and slot, and a retainer that secures the journal $j'$, within slot $a'$, all as herein described.

4. The combination, in a wire-cloth reel and cutter, of side plates A, A', having, respectively, an opening $a$ and slot $a'$, a slotted or grooved cutting-table I $i$ secured to said plates, rollers D, E, F, journaled in them, arms G, G', pivoted to the machine, and carrying a longitudinally-slotted knife guide H, $h$, a two-part roller J, J', having divided journals $j$, $j'$, capable of bearing within said opening and slot, and a turn button C, that retains the journal $j'$, within said slot $a'$, all as herein described.

5. The combination, in a cloth-cutting machine, of a frame, a slotted or grooved cutting-table secured thereto, a set of rollers journaled in said frame, and so arranged as to form a concave receptacle, and a swinging knife-guide coupled to the machine and capable of being brought to bear upon said table, for the purpose stated.

In testimony whereof I affix my signature in presence of two witnesses.

OLIVER P. SCHRIVER.

Witnesses:
JAMES H. LAYMAN,
ARTHUR MOORE.